US012036659B2

(12) United States Patent
Sklenar

(10) Patent No.: US 12,036,659 B2
(45) **Date of Patent: *Jul. 16, 2024**

(54) ADJUSTABLE SUPPORT DEVICE

(71) Applicant: Fred Sklenar, Saint Paul, MN (US)

(72) Inventor: Fred Sklenar, Saint Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/335,391

(22) Filed: Jun. 15, 2023

(65) Prior Publication Data

US 2023/0321811 A1 Oct. 12, 2023

Related U.S. Application Data

(63) Continuation-in-part of application No. 17/717,282, filed on Apr. 11, 2022, now Pat. No. 11,717,943.

(51) Int. Cl.
*B25H 1/10* (2006.01)

(52) U.S. Cl.
CPC .................................... *B25H 1/10* (2013.01)

(58) Field of Classification Search
CPC ........... B25B 11/00–11/02; B25H 1/10; B05B 13/0285
See application file for complete search history.

(56) References Cited

U.S. PATENT DOCUMENTS 4,542,891 A 9/1985 Kirby
4,744,552 A 5/1988 Glaser
5,082,234 A 1/1992 Smith
5,284,331 A 2/1994 Lee et al.
5,553,838 A 9/1996 Lee
6,135,435 A 10/2000 Schmitz
6,792,984 B2 9/2004 Fontaine
RE38,612 E 10/2004 Tucker et al.
7,299,840 B1 11/2007 Moschetti
7,654,510 B2 * 2/2010 Nishida ................. F16M 11/22
269/289 R
7,798,478 B2 9/2010 Janson et al.
(Continued)

OTHER PUBLICATIONS

Aliexpress, 7 cm Aluminium Benchdog T.DEER-BD 1807-A, Woodworking Workbench Clamps Benchdogs, https://www.aliexpress.com/i/32417402768.html, accessed May 24, 2022.
(Continued)

*Primary Examiner* — Jacob J Cigna
(74) *Attorney, Agent, or Firm* — GRUMBLES LAW PLLC; Brittany Haanan

(57) ABSTRACT

An adjustable support device can include a main body; a pin housed within the main body that is vertically adjustable and has external threading; a vertical protrusion that extends from a top face of the main body such that the vertical protrusion extends further upward past the side of the main body; and a wheel cap attached to the top of the main body and having internal threading, wherein the wheel cap and the pin are threadedly engaged. The adjustable support device can include a plug positioned below the main body; and a shoulder screw configured to removably connect the plug to the main body. The shoulder screw can be insertable through the center of the plug and can be configured to threadedly connect to an interior of the main body. The adjustable support device can include a cap grip interconnected with external surfaces of the wheel cap.

19 Claims, 11 Drawing Sheets

SECTION A - A

(56) References Cited

U.S. PATENT DOCUMENTS

| | | | | |
|---|---|---|---|---|
| 7,921,888 | B2 | 4/2011 | Sommerville et al. | |
| 7,946,319 | B2 | 5/2011 | Sommerville et al. | |
| 8,230,794 | B1 | 7/2012 | Haas | |
| D665,638 | S | 8/2012 | Krohmer et al. | |
| 8,282,088 | B2 | 10/2012 | Janson et al. | |
| 8,347,811 | B2 | 1/2013 | Bucci | |
| 8,459,628 | B2 | 6/2013 | Adkins | |
| 8,534,655 | B2 | 9/2013 | Hovarter | |
| 8,578,981 | B2 | 11/2013 | Sommerville et al. | |
| 9,061,399 | B2 * | 6/2015 | Krohmer | B25B 11/00 |
| D734,680 | S | 7/2015 | Eisinger | |
| 9,399,307 | B2 | 7/2016 | Sommerville et al. | |
| 9,969,011 | B1 | 5/2018 | Marusiak | |
| D850,880 | S | 6/2019 | Walters et al. | |
| 10,486,327 | B2 | 11/2019 | Wenning et al. | |
| 10,723,002 | B1 * | 7/2020 | Good | B25B 5/166 |
| 2012/0326376 | A1 | 12/2012 | Krohmer et al. | |
| 2021/0332941 | A1 * | 10/2021 | Lyons | B05C 13/00 |

OTHER PUBLICATIONS

Bessey, TW16AW19 Werkbank-Adapter AW16 Workbench, https://www.amazon.com/Bessey-Bench-Adaptor-Benches-TW16AW19/dp/B01ETAH7NO, accessed May 23, 2022.

DIY Bench Dogs, https://www.instructables.com/DIY-Bench-Dogs/, accessed May 24, 2022.

Powertec, 71037 Low Profile Bench Dogs, Woodworking Workbench Peg Stoppers for ¾" Holes, https://www.amazon.com/POWERTEC-71037-Bench-Dogs-4-Pack/dp/B01NBWC08Y/ref=sr_1_11?keywords=Bench+Dogs+Woodworking&qid=1653313909&sr=%E2%80%A6, accessed May 23, 2022.

Quick Action Front Dog Woodworking Vice, https://climaxvices.com/product/qd/, accessed May 24, 2022.

Rockler, Rockler Bench Cookie Plus Work Grippers, 4-pack, https://www.rockler.com/bench-cookie-plus-work-grippers-4pack, accessed May 23, 2022.

Rockler, Rockler Hold Down Clamp, 5-½"L×1-⅛"W, https://www.rockler.com/hold-down-clamp-5-1-2l-x-1-1-8w, accessed May 23, 2022.

Silverline Tools, 518609 Bench Cookie Plus Master Kit, Black, Set of 28 Pieces, https://www.amazon.com/Silverline-Tools-518609-Cookie-Master/dp/B07574FZJL/ref=asc_df_B07574FZJL/?tag=hyprod-20&linkCode=df0&hvadid=38517262984%E2%80%A6, accessed May 23, 2022.

Slipstick, Universal Bench Grippers, https://www.woodcraft.com/products/universal-bench-gripper, accessed May 23, 2022.

Taytools, Bundle Taytools 468631 Pack of 4 Each ¾x2-¼ Inches Bench Dogs Hold Downs for Workbenches, Anodized Aluminum, Side Springs, https://www.amazon.com/Taytools-468631-Workbenches-Anodized-Aluminum/dp/B07FRLZ9H3/ref=sr_1_5keywords=Bench+Dogs+Woodworking&qid=1653313%E2%80%A6, accessed May 23, 2022.

TriGrips 1600, MilesCraft, https://www.milescraft.com/product/trigrips/, accessed May 23, 2022.

* cited by examiner

SECTION B - B

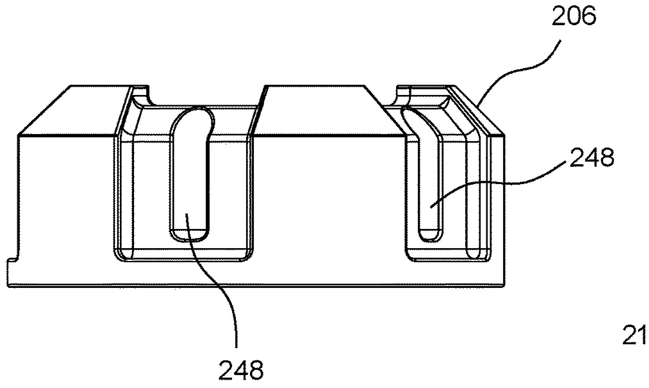
FIG. 24
FIG. 25
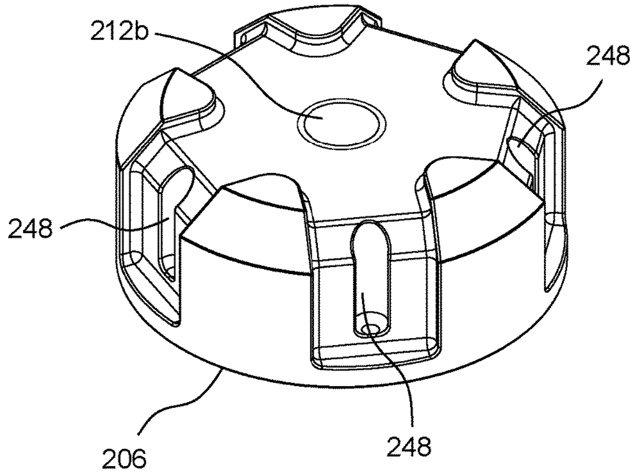
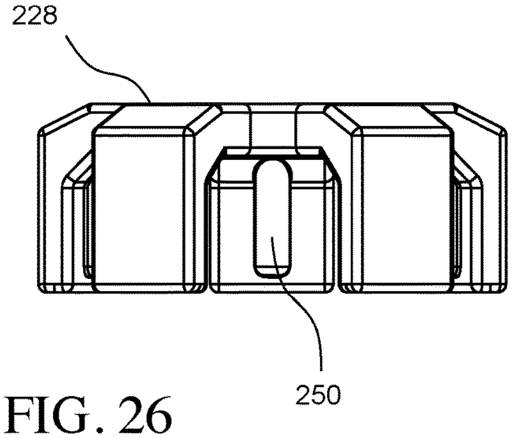
FIG. 26
FIG. 27
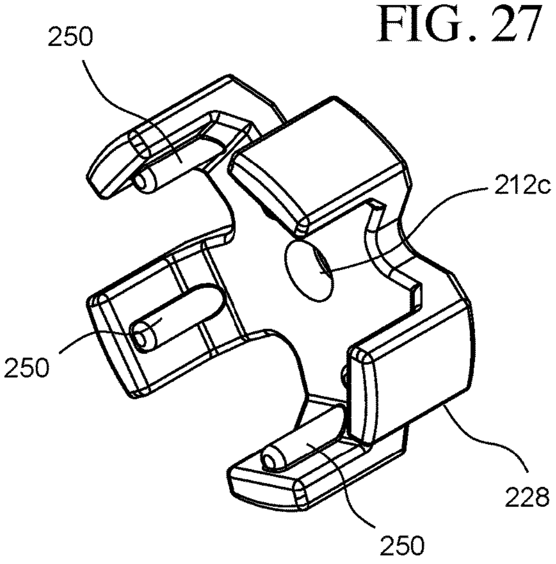

ADJUSTABLE SUPPORT DEVICE

FIELD OF THE INVENTION

This disclosure relates to devices used to support and/or secure items being worked on, and more particularly, relates to adjustable, multi-position, multi-functional devices for workbenches or other work surfaces that assist with securing objects or minimizing touch points with supported objects.

BACKGROUND OF THE INVENTION

Many objects that are worked upon using tools or accessories such as stains, paints, and brushes require the object being worked upon to be supported by, or secured to, the surface upon which it is set. In situations where the object being worked is being painted or stained, the object requires minimal contact with the support device. Further, objects that are painted or stained at a later stage in their creation process, often require more secure holding mechanisms earlier in their creation process while they are being assembled. However, some of these objects may be fragile or easily broken, especially if the object is of soft and/or easily damaged material, such as wood, plastics, fabrics, etc. Therefore, a traditional vise would likely damage an object of this configuration and, further, would not be useful in supporting an object once it requires painting or staining. Devices that would be more suitable to supporting an object for painting or staining, however, would not be suitable for securing the object in place during construction or assembly. Therefore, a device is needed that can both securely hold a relatively breakable object being worked upon and provide minimal contact points when supporting the object during painting, staining, or other activities for which minimal contact points would be desired. Further, it is desired that the same device is also able to secure an object to be worked upon during activities such as wood carving, filing, sanding, etc.

SUMMARY

This disclosure relates to workbench devices used to support and/or secure items being worked on, and more particularly, relates to an adjustable support device. In one aspect, the disclosure provides an adjustable support device that can include a main body having a top face, a side, and a bottom face; a pin housed within the main body that is vertically adjustable and has external threading; a vertical protrusion that extends from the top face of the main body such that the vertical protrusion extends further upward past the side of the main body; and a wheel cap attached to the top of the main body and having internal threading, wherein the wheel cap and the pin are threadedly engaged. The adjustable support device can further include a plug positioned below the main body and a shoulder screw configured to removably connect the plug to the main body. Further, the plug can be comprised of a compressible material and can be tapered from its top to its bottom, the shoulder screw can be insertable through the center of the plug, and the shoulder screw can be configured to threadedly connect to an interior of the main body. Additionally, the main body can be a solid housing, and the vertical channel and the shoulder screw can be separated by solid material of the main body. The main body can have an internal, hollow, vertical channel, and a threaded channel for the shoulder screw positioned directly beneath the internal, hollow, vertical channel.

In some embodiments, a cap grip can be interconnected with external surfaces of the wheel cap. The cap grip can have equilaterally spaced fingers that extend out laterally from a central portion and extend downward into corresponding overhangs that are external to the cap grip, and the wheel cap and the cap grip can each have a hole in their respective centers for the pin to protrude through. Further, a lower grip can be connected to a bottom face of the main body, and the cap grip and the lower grip can be comprised of non-slip materials. In some cases, the wheel cap can have equilaterally spaced voids along its circumference that are filled by the corresponding fingers. Additionally, the wheel cap can have a channel within each of the equilaterally spaced voids, the fingers of the cap grip can each have a protrusion on an interior surface, and the protrusions of the fingers correspond to, and align with, the channels of the voids.

In some cases, the adjustable support device can further include a band positioned around the main body. The band can be comprised of a non-slip material.

In some embodiments, the pin can be comprised of at least one wing positioned along a side of the pin and toward a bottom of the pin, and a pin point on a top end of the pin, wherein the pin point can be a tapered cone with its tip at an uppermost point of the pin, the external threading of the pin can be located below the pin point, the external threading can be limited to an upper portion of the pin, and the wing can be located below the external threading of the pin. Further, the at least one wing can be comprised of two wings located on opposing sides of the pin, and the external threading can be located above the two wings.

In some cases, the main body can be a cylindrical housing having an internal, vertical channel that is hollow, the vertical channel can be equidistant from each side of the main body, the vertical channel can have at least one vertical slot along an exterior edge of the vertical channel, the pin can be located within the vertical channel and can be comprised of at least one wing positioned along a side of the pin, and the at least one wing can be within the at least one vertical slot and can be configured to slide up and down the at least one vertical slot.

In some embodiments, the wheel cap can have a hole in its center for the pin to protrude through. In some cases, the wheel cap may attach to the main body using a spring clip positioned around a spring clip slot of the main body. Further, the main body, the pin, and the wheel cap can be centered on a vertical axis. In other cases, the vertical protrusion can include a spring clip slot positioned around a circumferential surface of the vertical protrusion, and a spring clip located in the spring clip slot. The adjustable support device can further include a retaining plate having a plurality of fastener openings; and a plurality of mechanical fasteners that are each positioned within a corresponding fastener opening. The retaining plate can be positioned between the top face of the main body and the spring clip, and the mechanical fasteners can attach the retaining plate to the wheel cap. Further, the plurality of fastener openings can be positioned circumferentially around a center hole of the retaining plate, and the main body can have a plurality of through holes that align with the plurality of fastener openings in the retaining plate.

In some cases, the vertical protrusion can be roughly cylindrical and can have a smaller circumference than a circumference of the main body. In some cases, the threaded engagement between the pin and the wheel cap can allow for the wheel cap to spin in a single direction a plurality of times.

In another aspect, the disclosure provides method of adjusting an adjustable support device that can include the steps of gripping a wheel cap that is attached to a main body having a vertical protrusion, wherein the vertical protrusion extends further upward than a top portion of a side of the main body; and spinning the wheel cap in a first direction until a pin point of a pin protrudes a predetermined amount through a top surface of the wheel cap, wherein the pin is threadedly engaged with the wheel cap, the pin point is tapered with its tip at an uppermost point of the pin, the pin is further comprised of at least one wing along a side surface, the main body is comprised of an internal, vertical channel that is hollow, the vertical channel has at least one vertical slot along an exterior edge of the vertical channel, and the at least one wing is within the at least one vertical slot and is configured to slide up the at least one vertical slot as the wheel cap is spun in a first direction.

The method can further include the steps of attaching a plug to a bottom of the main body by threadedly connecting a shoulder screw to an interior of the main body, wherein the shoulder screw is in a center of the plug, and a bottom of the main body includes an opening to a threaded channel in the interior of the main body.

The above summary is not intended to describe each and every example or every implementation of the disclosure. The description that follows more particularly exemplifies various illustrative embodiments.

BRIEF DESCRIPTION OF THE DRAWINGS

The following description should be read with reference to the drawings. The drawings, which are not necessarily to scale, depict examples and are not intended to limit the scope of the disclosure. The disclosure may be more completely understood in consideration of the following description with respect to various examples in connection with the accompanying drawings, in which:

FIG. 24 is a side view of a wheel cap of the adjustable support device of FIG. 20;

FIG. 25 is a perspective view of the wheel cap of FIG. 24;

FIG. 26 is a side view of a cap grip of the adjustable support device of FIG. 20; and FIG. 27 is a perspective view of the cap grip of FIG. 26.

DETAILED DESCRIPTION

Figure 1:
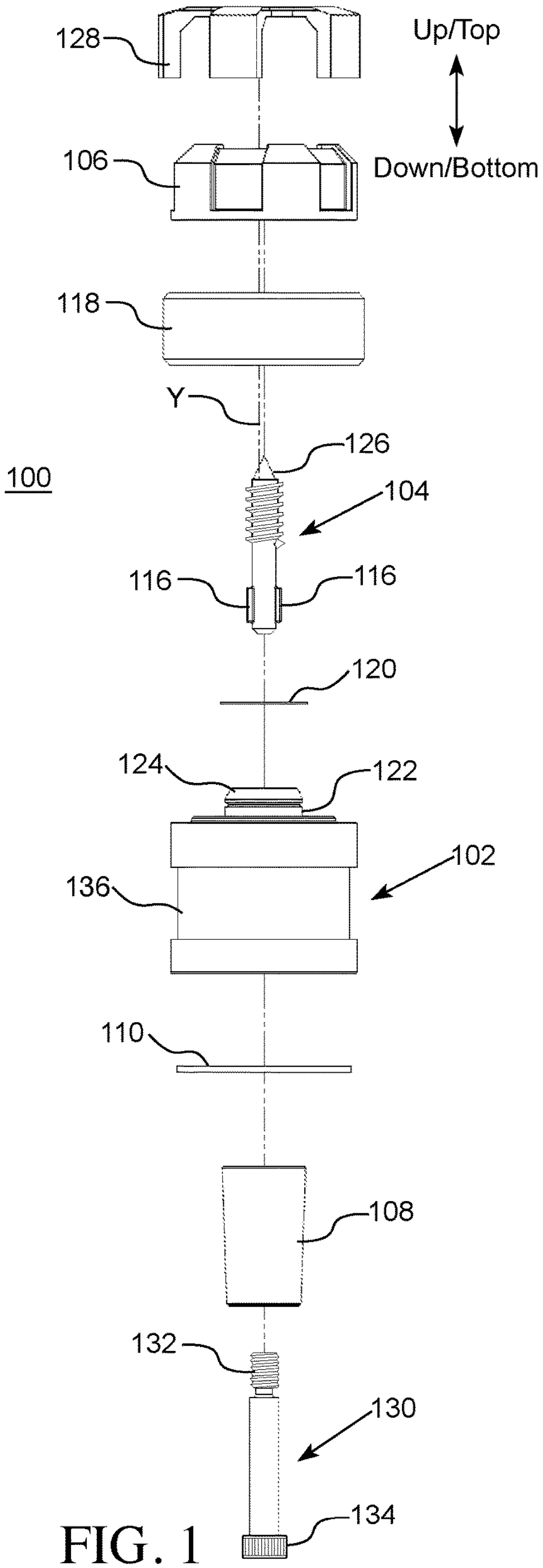
FIG. 1 is an exploded, side view of an illustrative example of an adjustable support device of the present disclosure.

The present disclosure relates to workbench devices used to support and/or secure items being worked on, and more particularly, relates to an adjustable support device. Various embodiments are described in detail with reference to the drawings, in which like reference numerals may be used to represent like parts and assemblies throughout the several views. Reference to various embodiments does not limit the scope of the systems and methods disclosed herein. Examples of construction, dimensions, and materials may be illustrated for the various elements, and those skilled in the art will recognize that many of the examples provided have suitable alternatives that may be utilized. Any examples set forth in this specification are not intended to be limiting and merely set forth some of the many possible embodiments for the systems and methods. It is understood that various omissions and substitutions of equivalents are contemplated as circumstances may suggest or render expedient, but these are intended to cover applications or embodiments without departing from the spirit or scope of the disclosure. Also, it is to be understood that the phraseology and terminology used herein are for the purpose of description and should not be regarded as limiting.

Figure 20:
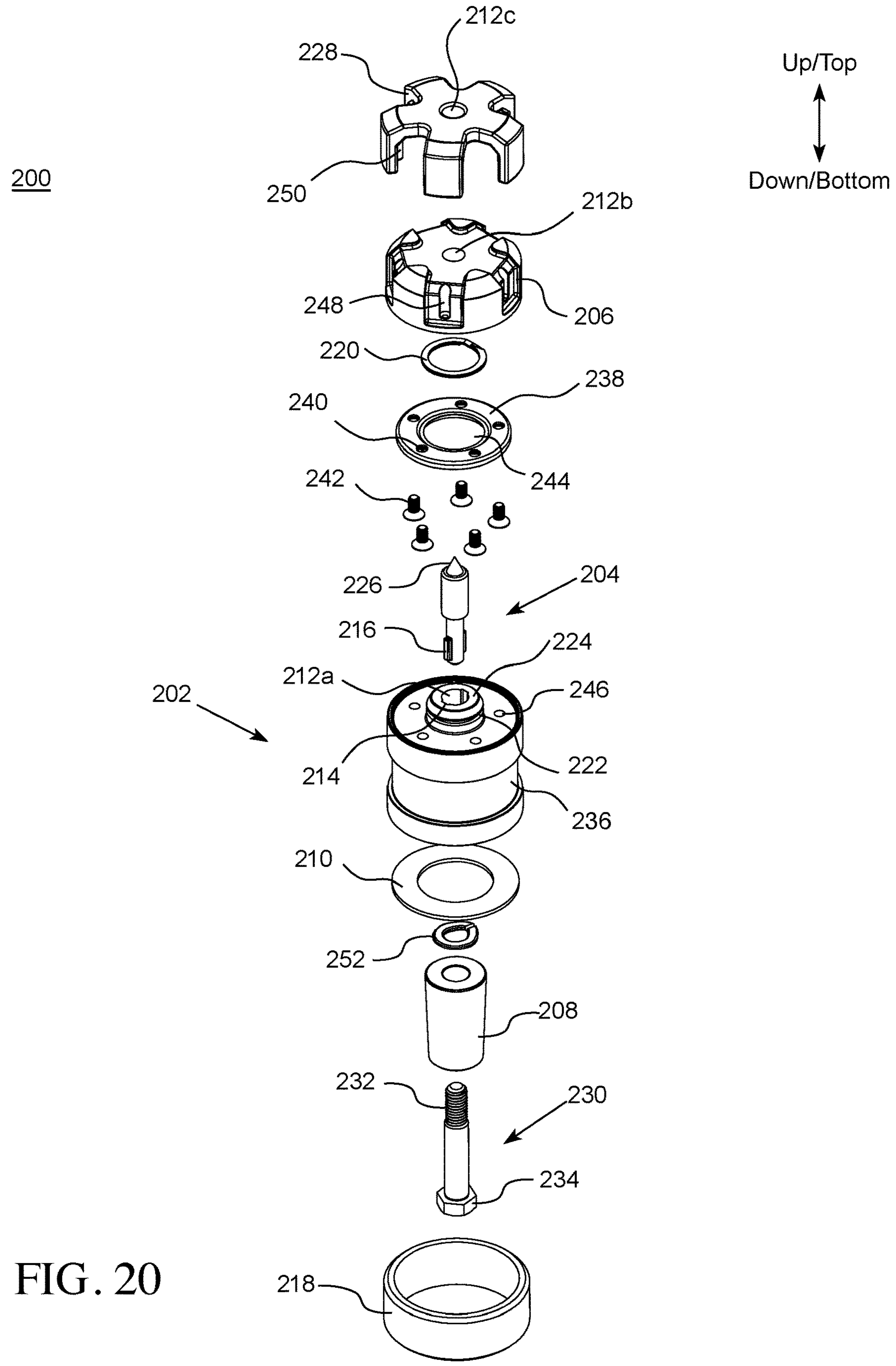
FIG. 20 is an exploded, perspective view of a second, illustrative example of an adjustable support device of the present disclosure.

In the following description, as is traditional, the terms "up" and "down" refer to y axis movement in opposing directions, respectively, with "up" meaning the device, assembly, or relevant components are moving in a generally upward direction and "down" meaning the device, assembly, or components are moving in a generally downward direction. Further, the terms "top" and "bottom" refer to opposing ends of portions of the device, assembly, or components, with "top" meaning the end of the device, assembly, or component traditionally positioned over or on top of the other various portions of the device, assembly, or components when in its active, in use configuration and "bottom" meaning the end of the device, assembly, or components traditionally positioned beneath or below the other various portions of the device, assembly, or components when in its active, in use configuration. FIGS. 1 and 20 illustrate the up/top and down/bottom directions relative to one embodiment of the device, assembly, and components.

FIG. 1 is an exploded, side view of an illustrative example of an adjustable support device of the present disclosure.

The device 100 can include main body 102, pin 104, wheel cap 106, and plug 108. Main body 102 can include lower grip ring 110, vertical channel 112 (inclusive of 112*a-c*) interior to main body 102, vertical slot 114 along vertical channel 112, band 118, spring clip 120 in spring clip slot 122, and vertical protrusion 124 around which spring clip slot is located. Pin 104 can include one or more wings 116 and pin point 126. Wheel cap 106 can include cap grip 128. Plug 108 can be paired with shoulder screw 130, which can include tip 132 and base 134. Band 118 can be positioned within circumferential channel 136 of main body 102.

Figure 2:
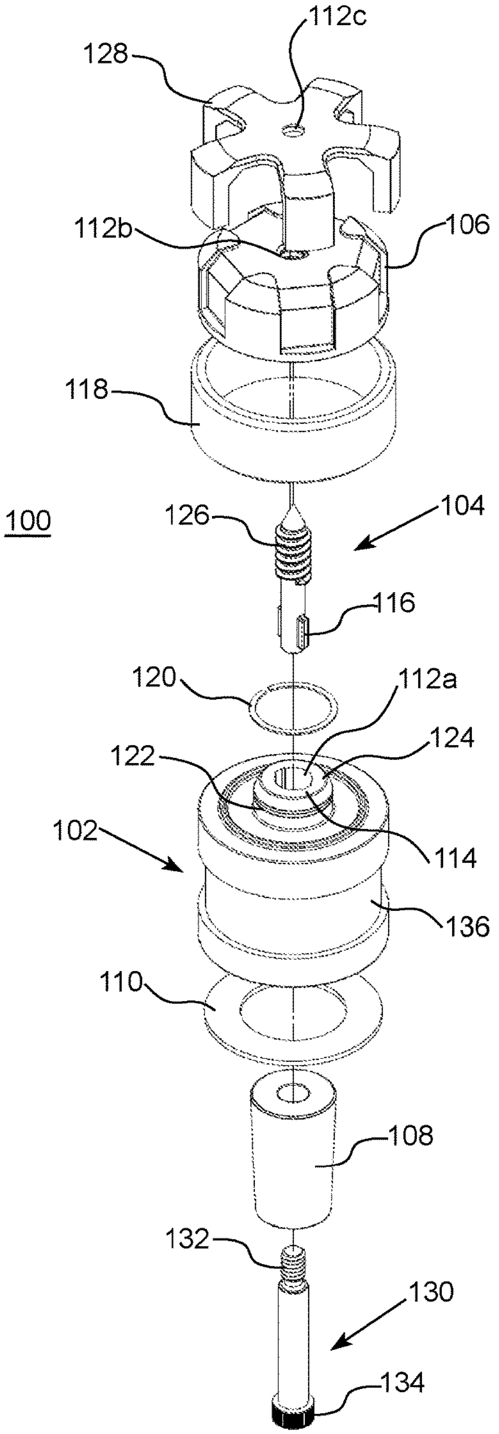
FIG. 2 is an exploded perspective view of the adjustable support device.
Figure 5:
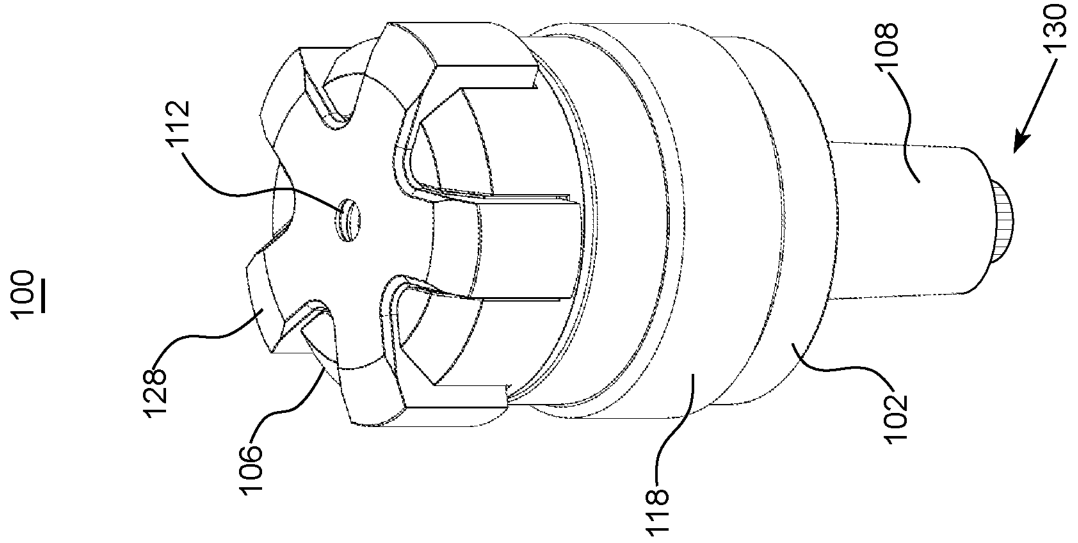
FIG. 5 is a perspective view of the adjustable support device with a pin in a withdrawn position.
Figure 4:
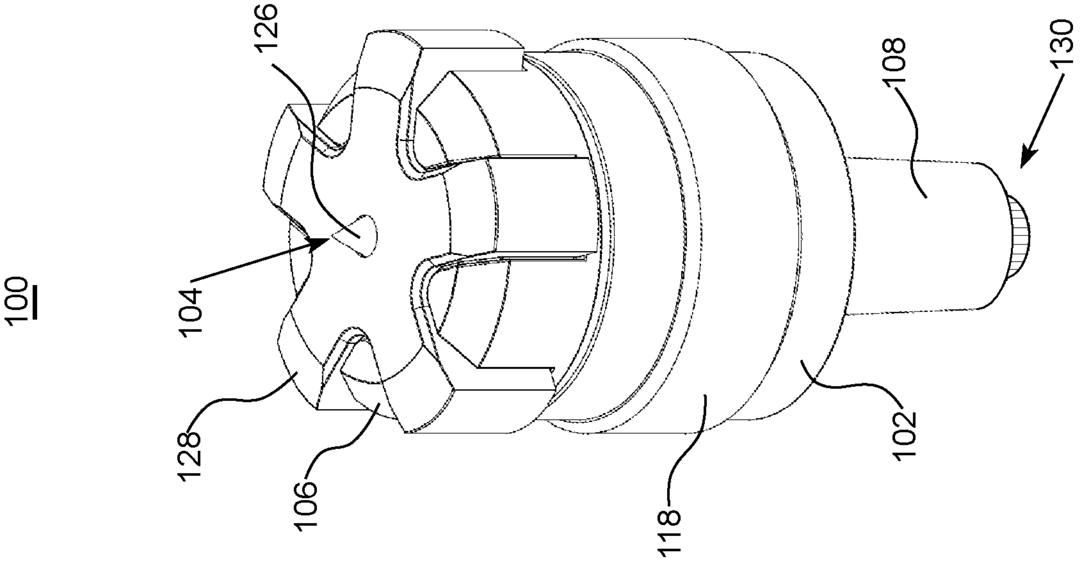
FIG. 4 is a perspective view of the adjustable support device with a pin in a partially-advanced position.
Figure 3:
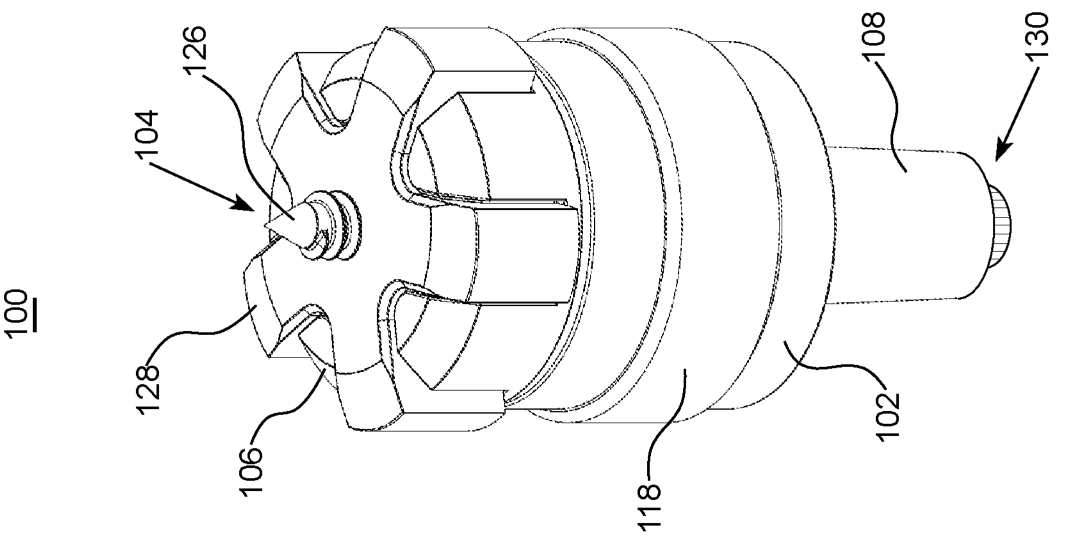
FIG. 3 is a perspective view of the adjustable support device with a pin in an advanced position.
Figure 7:
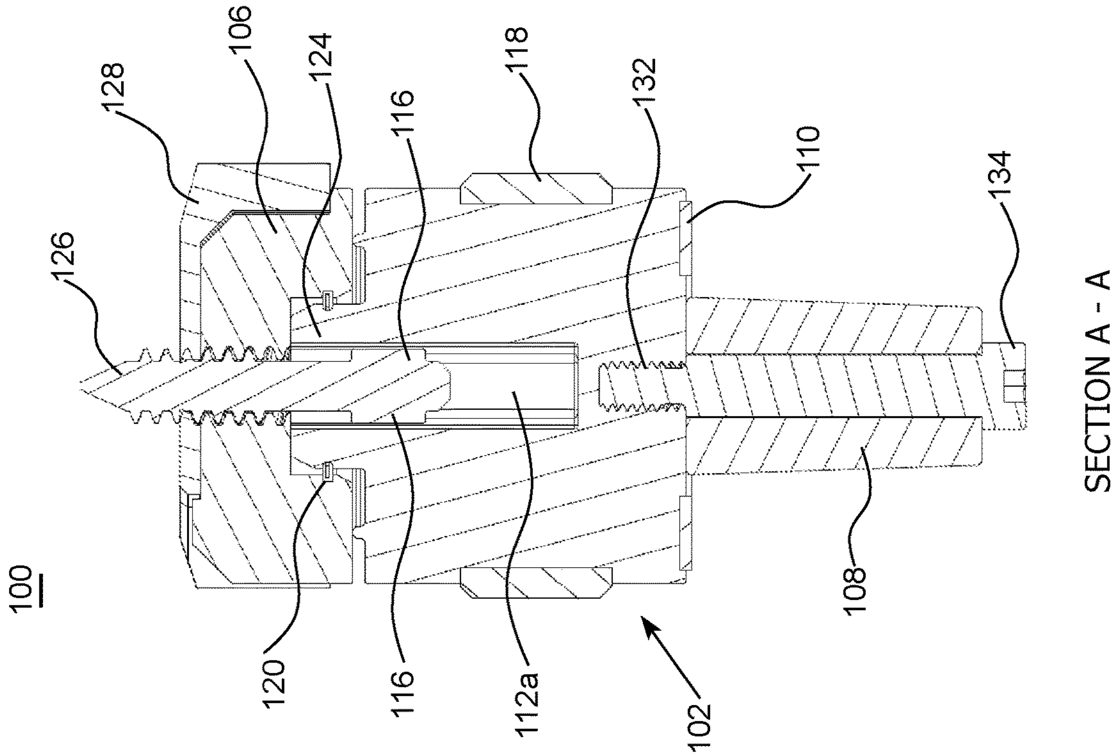
FIG. 7 is a cross-sectional view of the adjustable support device taken from the line A-A in FIG. 6.
Figure 6:
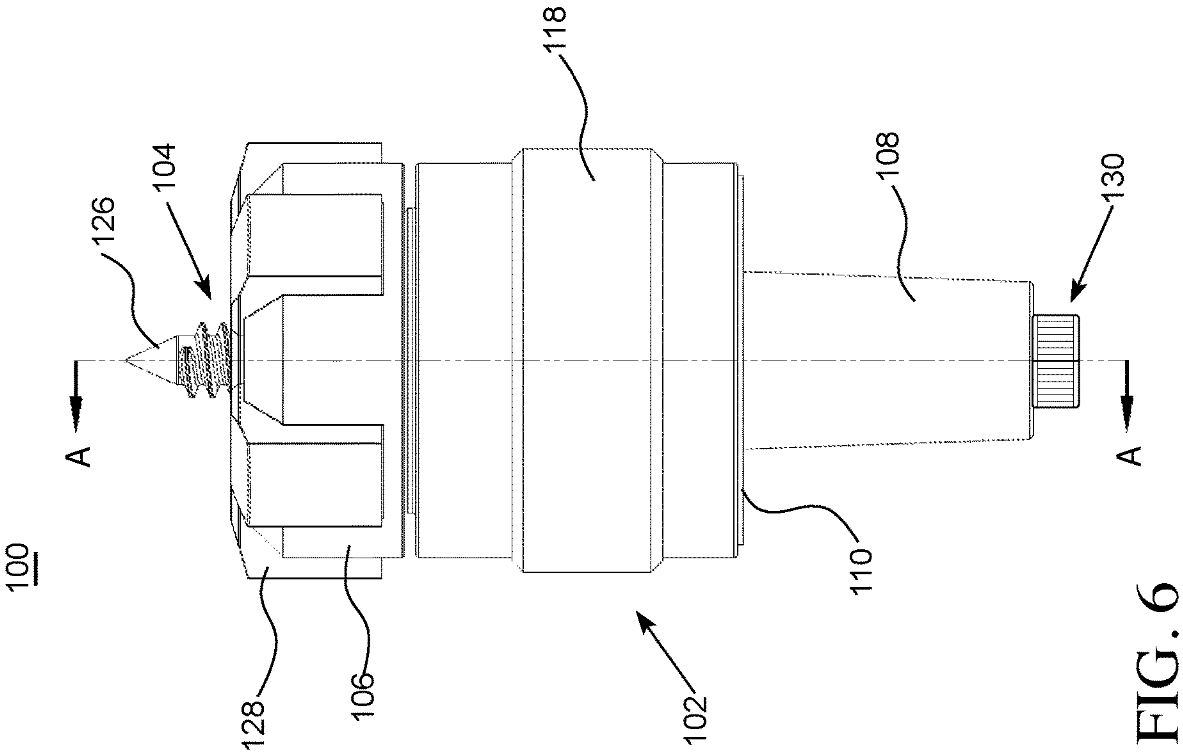
FIG. 6 is a side view of the adjustable support device with the pin in an advanced position.
Figure 9:
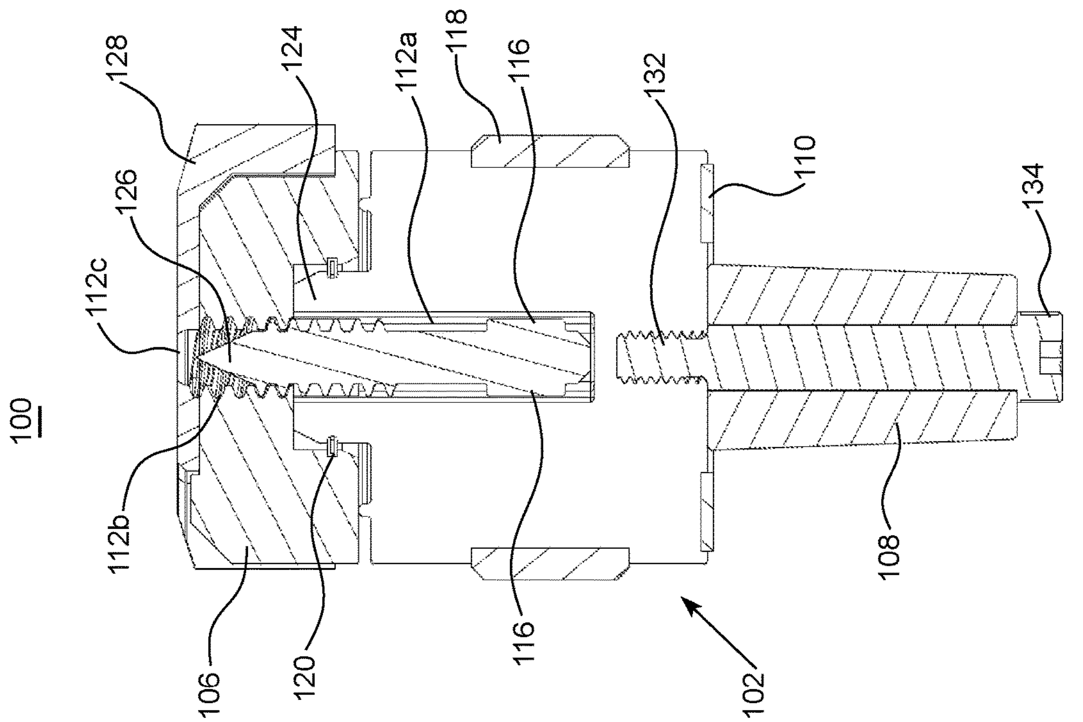
FIG. 9 is a cross-sectional view of the adjustable support device taken from the line B-B in FIG. 8.
Figure 8:
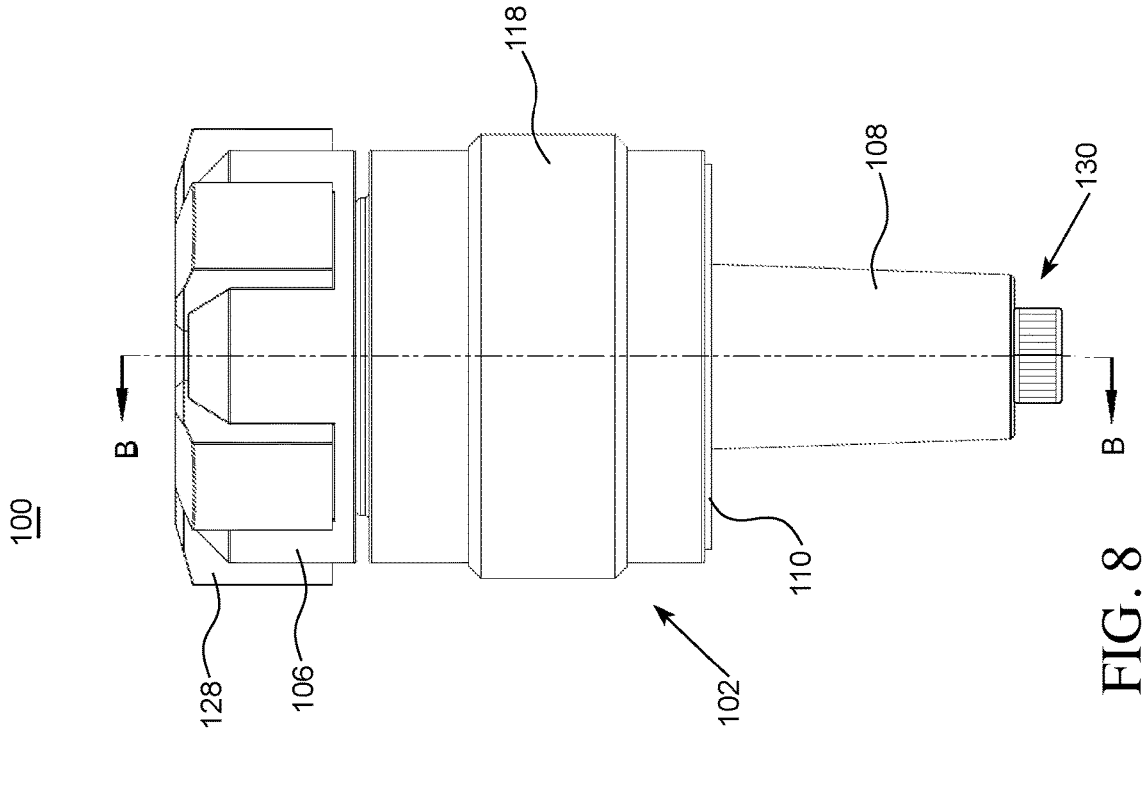
FIG. 8 is a side view of the adjustable support device with the pin in a withdrawn position.
Figure 10:
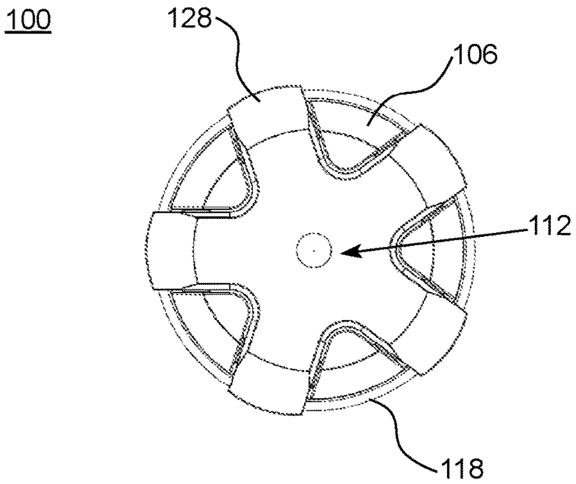
FIG. 10 is a top view of the adjustable support device.
Figure 11:
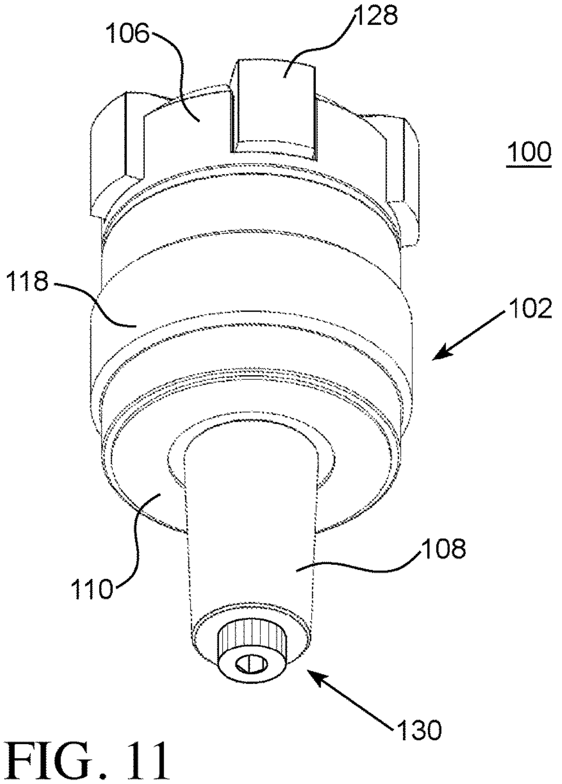
FIG. 11 is a bottom, perspective view of the adjustable support device.
Figure 12:
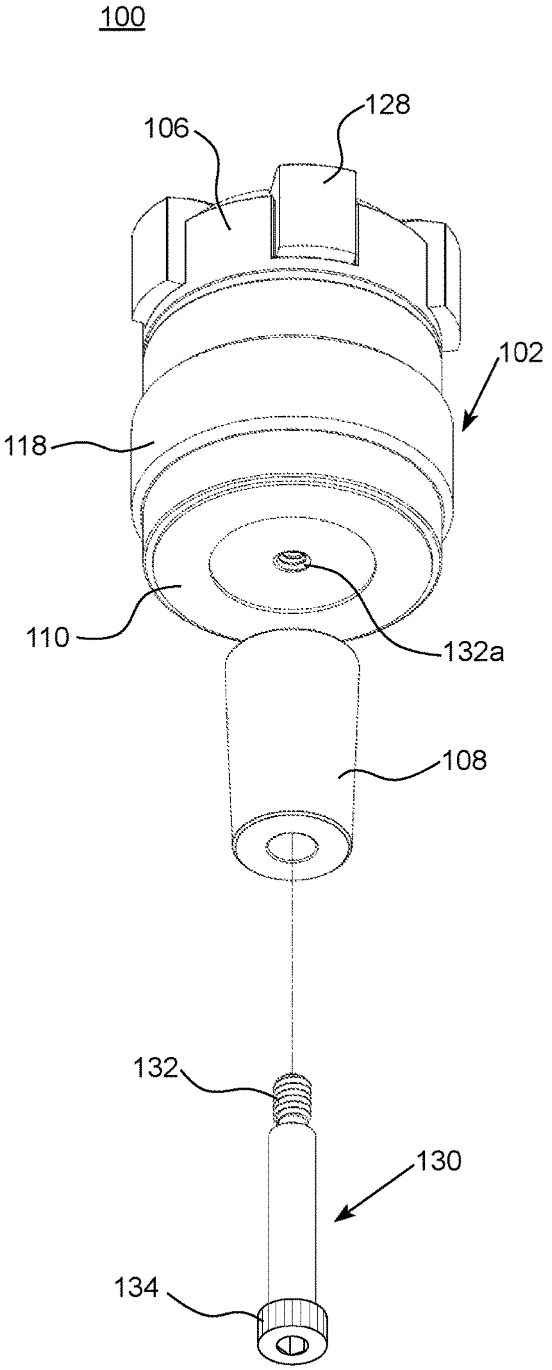
FIG. 12 is a partially exploded bottom, perspective view of the adjustable support device.
Figure 15:
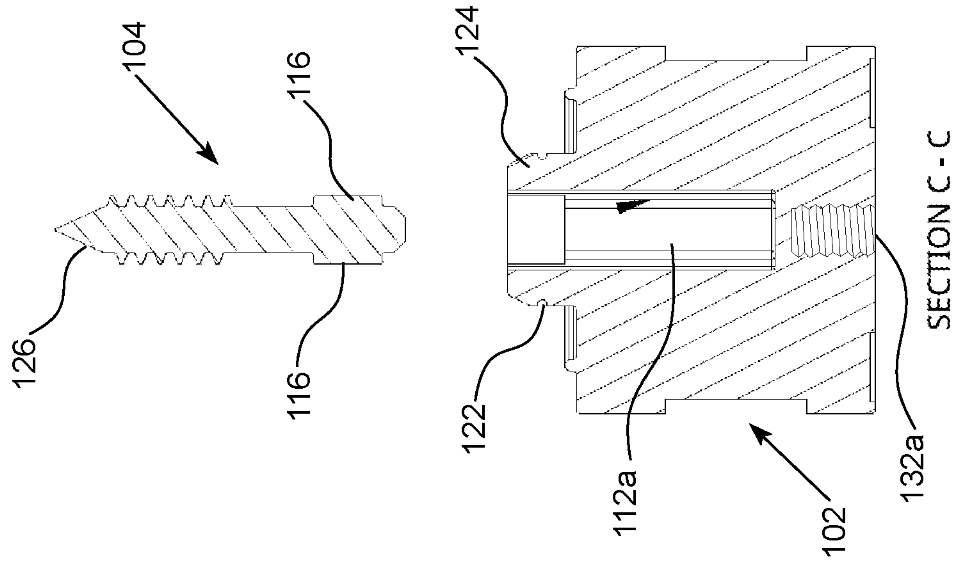
FIG. 15 is a cross-sectional view of the main body and pin of the adjustable support device taken from the line C-C in FIG. 14.
Figure 14:
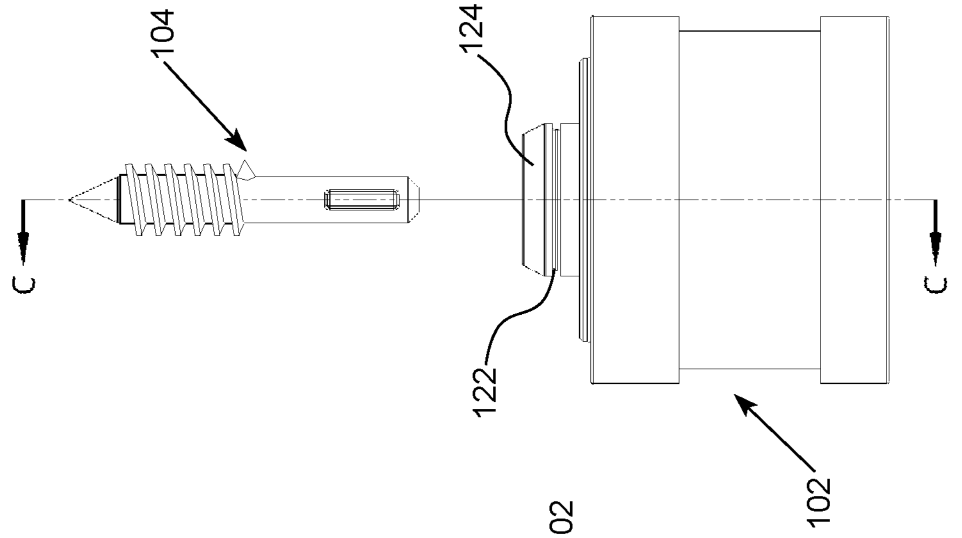
FIG. 14 is a schematic, side view of the main body and pin of the adjustable support device.
Figure 13:
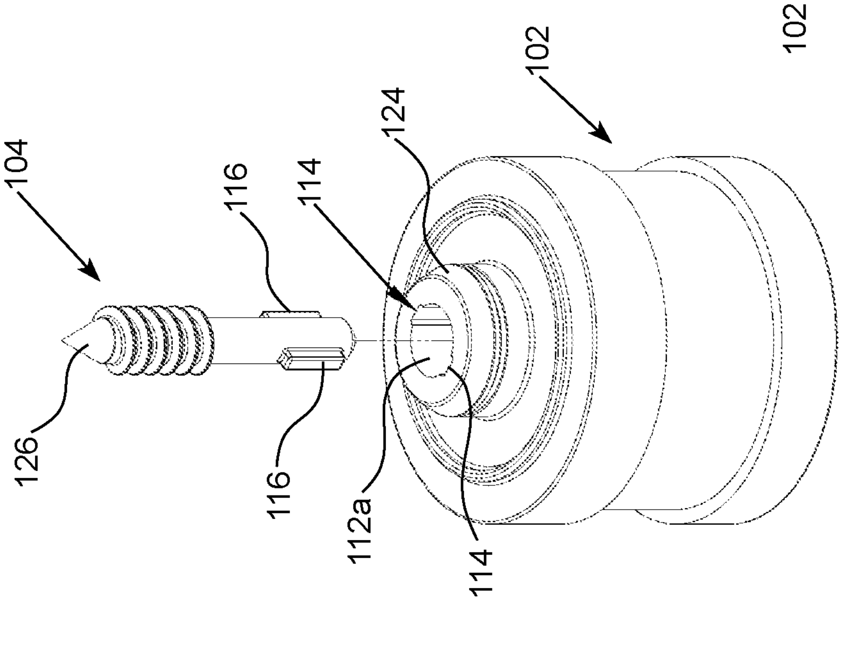
FIG. 13 is a schematic, perspective view of the main body and pin of the adjustable support device.
Figure 16:
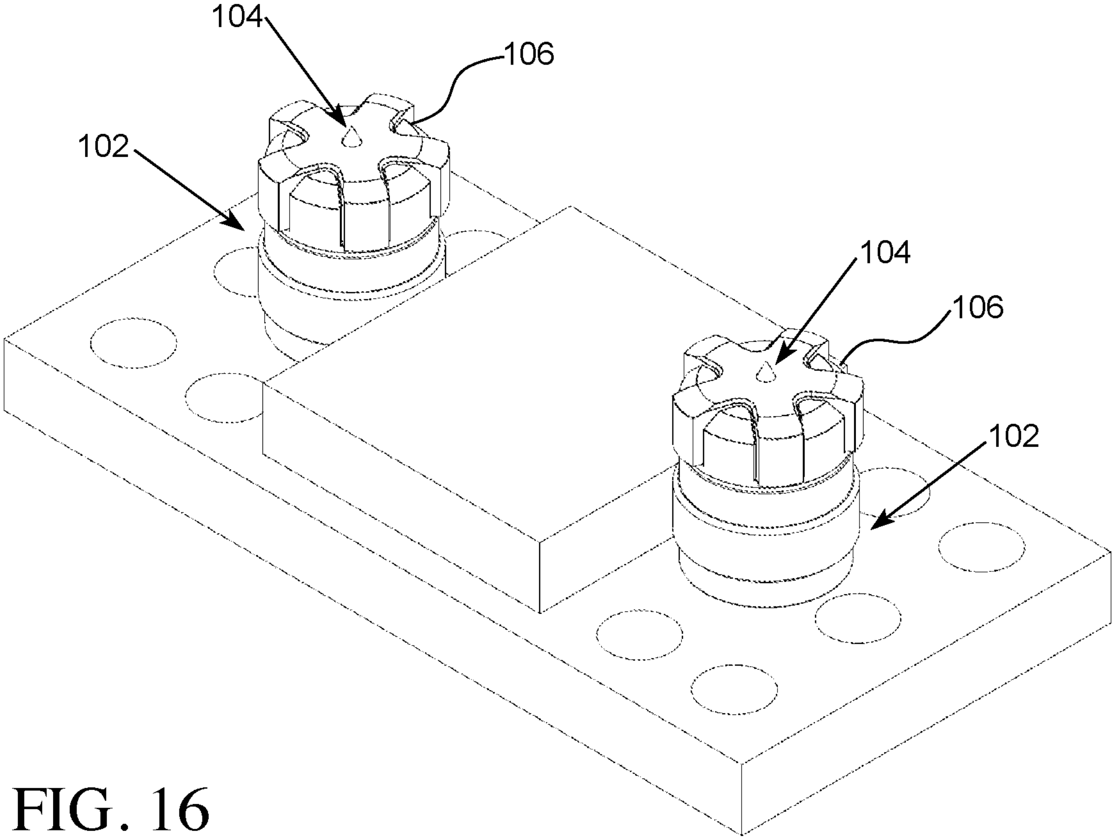
FIG. 16 illustrates two of the adjustable support devices in use with a working piece secured between the two devices.
Figure 17:
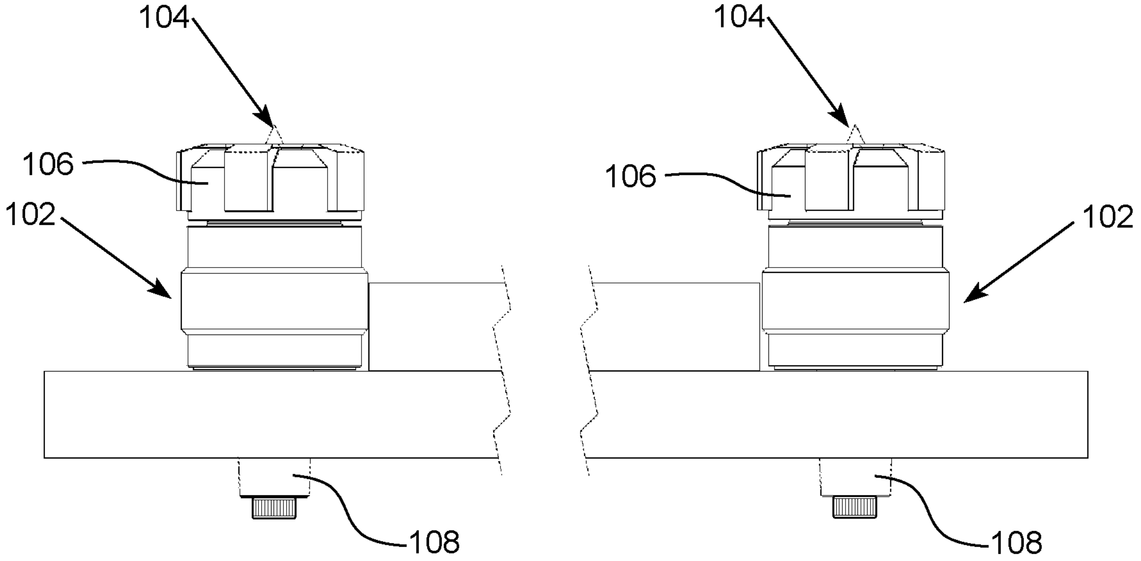
FIG. 17 is a side view of the system of FIG. 16.
Figure 18:
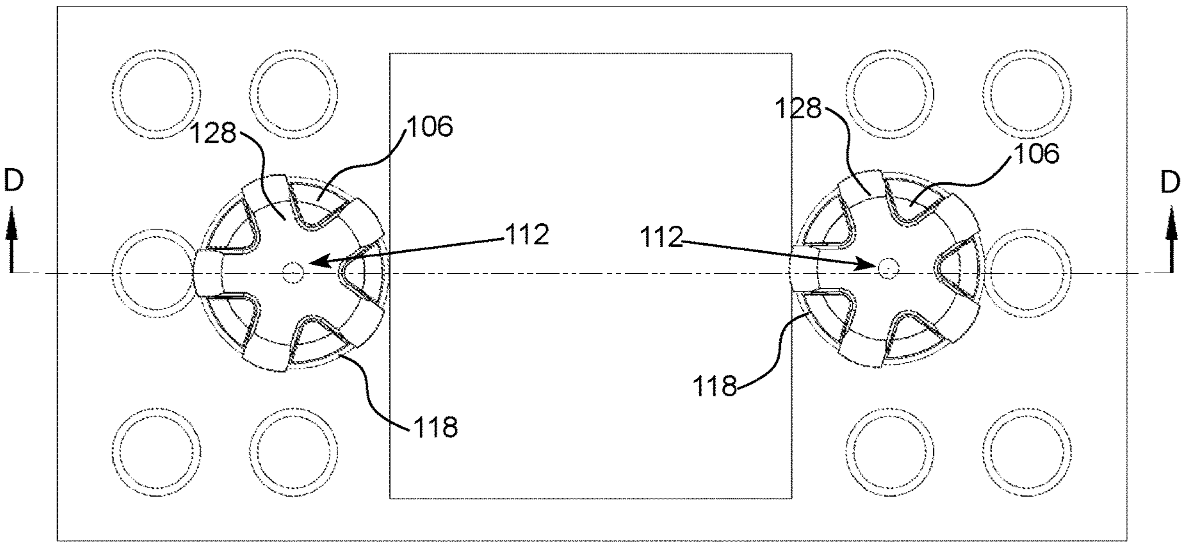
FIG. 18 is a top view of the system of FIG. 16.
Figure 19:
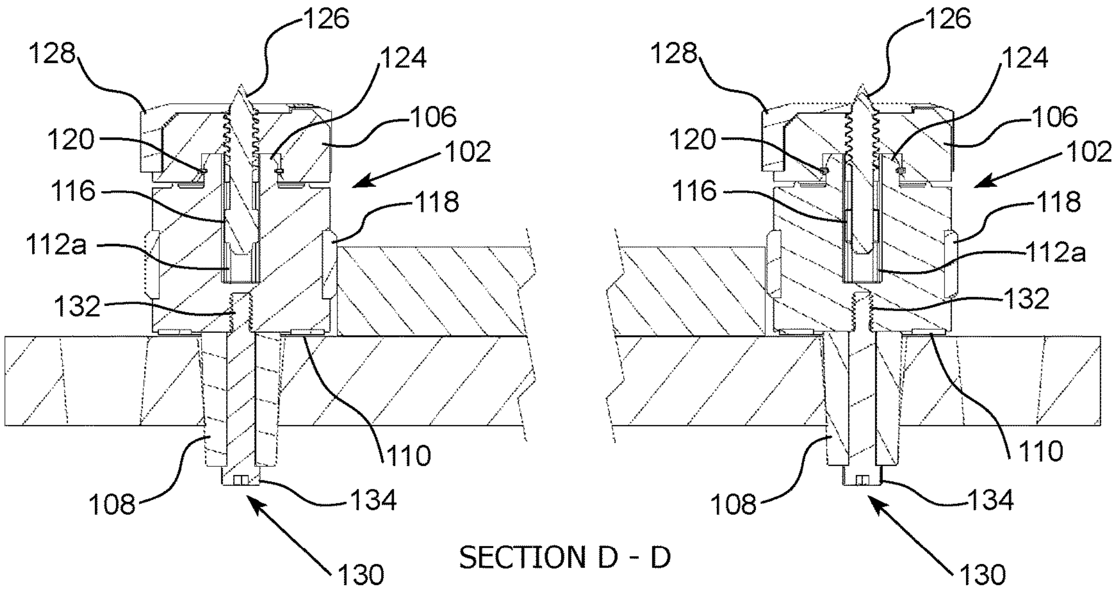
FIG. 19 is a cross-sectional view of the system of FIG. 16 taken from the line D-D in FIG. 18.

Additional views of the adjustable support device are provided. FIG. 2 is an exploded perspective view of the adjustable support device. FIG. 3 is a perspective view of the adjustable support device with a pin in an advanced position. FIG. 4 is a perspective view of the adjustable support device with a pin in a partially-advanced position. FIG. 5 is a perspective view of the adjustable support device with a pin in a withdrawn position. FIG. 6 is a side view of the adjustable support device with the pin in an advanced position. FIG. 7 is a cross-sectional view of the adjustable support device taken from the line A_A in FIG. 6. FIG. 8 is a side view of the adjustable support device with the pin in a withdrawn position. FIG. 9 is a cross-sectional view of the adjustable support device taken from the line B-B in FIG. 8. FIG. 10 is a top view of the adjustable support device. FIG. 11 is a bottom, perspective view of the adjustable support device. FIG. 12 is a partially exploded bottom, perspective view of the adjustable support device. FIG. 13 is a schematic, perspective view of the main body and pin of the adjustable support device. FIG. 14 is a schematic, side view of the main body and pin of the adjustable support device. FIG. 15 is a cross-sectional view of the main body and pin of the adjustable support device taken from the line C-C in FIG. 14. FIG. 16 illustrates two of the adjustable support devices in use with a working piece secured between the two devices. FIG. 17 is a side view of the system of FIG. 16. FIG. 18 is a top view of the system of FIG. 16. FIG. 19 is a cross-sectional view of the system of FIG. 16 taken from the line D-D in FIG. 18.

FIG. 20 is an exploded, perspective view of an illustrative example of an adjustable support device of the present disclosure. The device 200 can include many of the same components as the first embodiment of FIG. 1. For example, the adjustable support device 200 can include main body 202, pin 204, wheel cap 206, and plug 208. Main body 202 can include lower grip ring 210, vertical channel 212 (inclusive of 212*a-c*) interior to main body 202, vertical slot 214 along vertical channel 212, band 218, spring clip 220 in spring clip slot 222, and vertical protrusion 224 around which spring clip slot is located. Pin 204 can include one or more wings 216 and pin point 226. Wheel cap 206 can include cap grip 228. Plug 208 can be paired with shoulder screw 230, which can include tip 232 and base 234. Washer 252 may be positioned around tip 232 and between plug 208 and main body 202. Band 218 can be positioned within circumferential channel 236 of main body 202. Additionally, the adjustable support device 200 can further include a retaining plate 238 having fastener openings 240 through which mechanical fasteners 242 can penetrate and threadedly engage with wheel cap 206. Retaining plate 238 can further include center opening 244, which allows for retaining plate 238 to fit around vertical protrusion 224. Main body 202 may include through holes 246, which allow access to the heads of mechanical fasteners 242. Wheel cap 206 can further include channels 248, which pair to protrusions 250 on cap grip 228.

Figure 21:
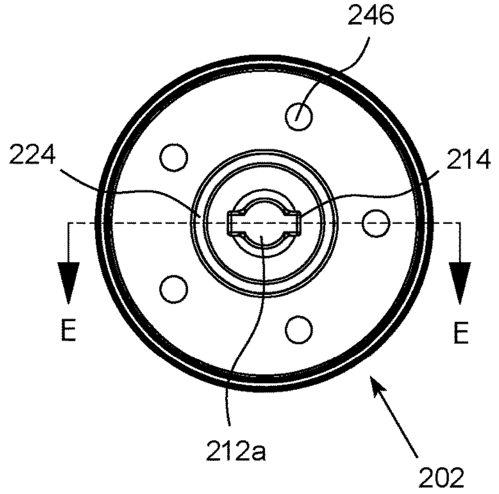
FIG. 21 is a top view of the main body of the adjustable support device of FIG. 20.
Figure 22:
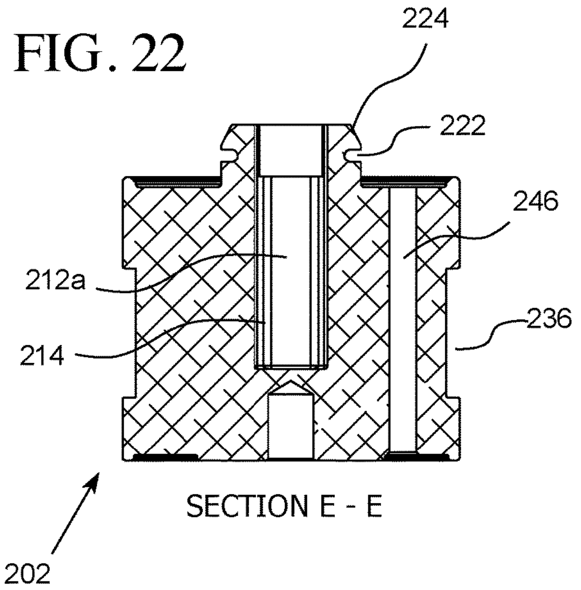
FIG. 22 is a cross-sectional view of the main body taken from the line E-E in FIG. 21.
Figure 23:
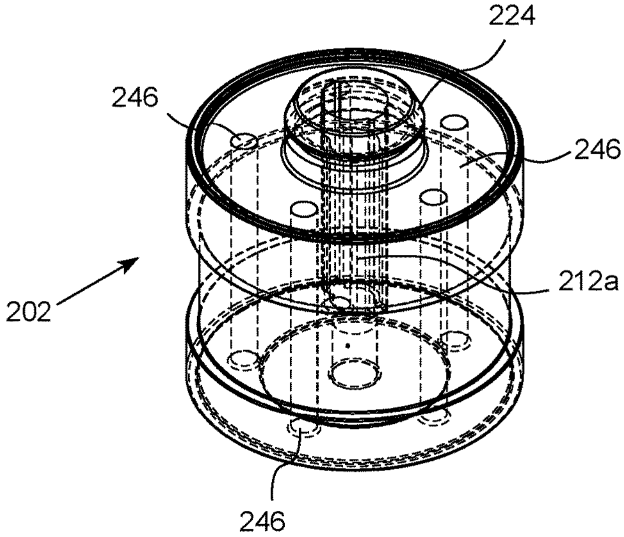
FIG. 23 is a translucent, perspective view of the main body of FIG. 21.

Additional views of the second embodiment of the adjustable support device are provided. FIG. 21 is a top view of the main body of the second embodiment of the adjustable support device. FIG. 22 is a cross-sectional view of the main body taken from the line E-E in FIG. 21. FIG. 23 is a translucent, perspective view of the main body of FIG. 21. FIG. 24 is a side view of a wheel cap of the second embodiment of the adjustable support device. FIG. 25 is a perspective view of the wheel cap of FIG. 24. FIG. 26 is a side view of a cap grip of the second embodiment of the adjustable support device. FIG. 27 is a perspective view of the cap grip of FIG. 26.

At least some of the various components of the adjustable support device can generally be comprised of rigid materials such that the device and its components cannot be folded, bent, or otherwise forced out of shape. Examples of materials that can be used include, but are not limited to, metal (for example, aluminum, steel, stainless steel, iron, brass, copper, etc.), plastic (for example, high-density polyethylene, polyvinyl chloride, polypropylene, other thermoplastic polymers, etc.), carbon fiber, ABS molding, glass-filled nylon, or other polymers, high durometer rubber (for example, Shore 80A to 100A), and combinations thereof.

Others of the various components of the adjustable support device may generally be comprised of flexible materials such that the components are deformable at room-temperature. Example of materials that can be used include, but are not limited to, elastics, silicone, low or medium durometer rubbers (for example, Shore 0A to 80A), and combinations thereof. Additional materials used herein may be described as “non slip” materials. Non slip materials may include those that are manufactured from a natural or synthetic rubber or similar material, which can provide the characteristic of tackiness or high-friction between the corresponding component and a surface, such as a table or workbench upon which the device may lay, and/or between the corresponding component and a working object in contact with the device.

Generally, the adjustable support device can include a main body that houses a retractable pin with a pin point, wherein the pin can be adjusted up and down through the main body using a wheel cap. The main body and the wheel cap can include a vertical channel through their centers in which the pin is housed and can move up and down. When the pin is in at least a partially advanced position (i.e., at least the pin point is protruding past the horizontal plane of the wheel cap), an object being worked on by a user can be placed on top of the pin for support and with minimal surface contact.

For example, an object being stained is typically stained on every visible surface. However, after several surfaces have been stained, the remaining surface(s) can only be worked on if the previously-stained surfaces make contact with a support device or even a user’s hands. By placing the object being worked on onto one or more pins of the disclosed adjustable support devices, the object can be supported while having minimal surface contact with the pin point.

Alternatively, if minimizing surface contact is not as important to a user and instead, the user wishes to prevent the object from sliding, the user can retract or withdraw the pin downward such that the pin is completely hidden and the object can be placed on the top of the adjustable support device (for example, on top of the wheel cap). To further prevent the object from sliding, a cap grip can be incorporate into the wheel cap and can have a medium to high friction coefficient. For example, the wheel cap may be relatively disc-shaped but with gaps or voids along the outer circumference and across a portion, or entirety, of its top surface, and the cap grip may be shaped to fill those gaps or voids (for example, with fingers) and extend slightly out past the various surface planes of the wheel cap. Therefore, the cap grip could be interconnected with external surfaces of the wheel cap, and the cap grip, as opposed to the wheel cap, can be the topmost portion of the device with which the object being worked on makes contact. To ensure an even more secure connection of the cap grip to the wheel cap, the wheel cap may have channels within the gaps or voids into which corresponding protrusions on interior surfaces of the fingers of the cap grip can be positioned.

To advance the pin upward or withdraw the pin downward for either of the use cases illustrated above, the wheel cap can be turned. More specifically, the pin or a portion thereof can be threaded, and the vertical channel through the interior of the main body and wheel cap can be threaded. Further, the pin can have one or more wings or fins that correspond to vertical slots in the vertical channel. Therefore, when the wheel cap is turned, the threads of the pin engage the threads of the vertical channel and the pin is prevented from spinning around a central axis by the engagement of the wing(s) with the vertical slot(s). In addition to providing a higher friction surface for object being worked on when placed on top of the adjustable support device, the cap grip described above can provide a higher friction surface for a user's fingers and hand when rotating the wheel cap to advance or withdraw the pin.

In some embodiments, the wheel cap is secured to the main body through use of a spring clip. More specifically, the main body can include a vertical protrusion that extends from the top surface of the main body, and a spring clip slot or channel can be located on and around this vertical protrusion. Therefore, the wheel cap can be placed over the vertical protrusion and on top of the top surface of the main body. The spring clip can then secure to an internal channel in the wheel cap and allow the wheel cap to rotate freely while being affixed to the vertical protrusion of the main body. Alternatively, the spring clip can be secured in the spring clip slot or channel of the vertical protrusion and used to retain a retaining plate between the spring clip and a top, flat surface of the main body that is positioned below the vertical protrusion. The retaining plate can have a plurality of openings through which mechanical fasteners can be positioned. The mechanical fasteners can then have a threaded connection with threaded openings on a bottom surface of the wheel cap, thereby connecting the wheel cap to the main body.

While the adjustable support device can be used as a support for a worked-upon object through use of the pin and/or cap grip, the adjustable work device can also be used as a clamp. More specifically, a band can be positioned around the exterior circumference of the main body, and the band can be made of a material having a medium to high friction coefficient. Therefore, if an object to be worked on is placed between two or more adjustable support devices, they can effectively hold, or clamp, it in place, as illustrated in FIGS. 16 and 18. To further assist in keeping the adjustable support devices secured in place so they can clamp a work object, the adjustable support device can include a plug and/or a lower grip ring.

More specifically, the adjustable support device can include a plug attached to the bottom of the main body that can be used for insertion into a hole in a workbench. The plug can function like a peg or a dowel in that it can be a cylindrical object that can be set into a corresponding cylindrical hole. Therefore, the plug can be inserted, pegged, plugged, or doweled into a hole of a working surface. If two or more adjustable support devices are used in combination to clamp an object in place, an object being worked on can be secured between them and the plugs, by being plugged into holes in a workbench (or other working surface), can secure their respective adjustable support devices in place so that the object being worked on is prohibited from movement in a medial, distal, proximal, or lateral direction, as illustrated in FIGS. 17 and 19.

However, the plug can be optionally removed from the adjustable support device and, in those cases, a lower grip ring, which can be made from a non-slip material, can be located on a bottom surface of the main body. The lower grip ring can function similarly to the plug in that when an object being worked on is placed on top of one adjustable support device or between two or more adjustable support devices, the lower grip rings of the devices can help keep the devices in place and, therefore, prevent the object being worked on from moving in a medial, distal, proximal, or lateral direction.

To attach or remove the plug from the main body, a shoulder screw can be used. More specifically, the plug can be approximately cylindrical in shape (although it may be slightly wider at its top compared to its base, or vice versa such that it has a tapered appearance), can have a flat top, a flat bottom, and can have a central, hollow cavity or column. A shoulder screw can be configured to fit within the hollow cavity of the plug and can be threaded on at least its tip or top end. The threaded portion of the shoulder screw can mate with a threaded interior portion of the main body. For example, the bottom face of the main body may have a hole that leads into a central channel that is threaded. Therefore, the plug can be placed up against the bottom of the main body and the shoulder screw can be used to threadedly secure the plug and the shoulder screw to the main body. In some cases, a washer, such as a split washer, may be positioned around the threaded portion of the shoulder screw and between the plug and the main body such that the plug does not make direct contact with the main body. In some embodiments, the shoulder screw may have a base that is wider than the hollow cavity of the plug so that the shoulder screw is prevent from inserting completely into the plug and so that a user has a portion of the shoulder screw available to grip when inserting or removing the shoulder screw and plug from the main body.

The above-mentioned parts of the adjustable support device will now be further explained with reference to the drawings. The pieces and parts described for adjustable support device 100 are assumed to be the same for the pieces and parts of adjustable support device 200 unless otherwise described.

Main body 102, pin 104, and wheel cap 106 can be the main components that make up adjustable support device 100, as illustrated in FIG. 3. In some embodiments, plug 108 is also present to assist with keeping the adjustable support device fixed in a specific location on, for example, a work bench having holes. However, plug 108 may be removable, as illustrated in FIG. 12, such that lower grip ring 110 may be used as an alternative to plug 108. Briefly, as described above, the adjustable support device functions by having main body 102 house pin 104 and by pairing pin 104 to wheel cap 106, which is attached to main body 102, such that rotation of wheel cap 106 in clockwise and counter-clockwise directions causes pin 104 to move up and down. As mentioned above wherein components of adjustable support device 100 correspond to components of adjustable support device 200, main body 202, pin 202, and wheel cap 206 can be the corresponding main components that make up adjustable support device 200, as illustrated in FIG. 20, and plug 208 may be present, although removable, to assist with keeping the adjustable support device fixed in a specific location on, for example, a work bench having holes. The details of these components, as described in more detail below with relation to adjustable support device 100, carry through to adjustable support device 200.

Main body 102 may be approximately cylindrical, which can give the adjustable support device a cylindrical appearance. Further, the adjustable support device can have a vertical channel 112 (comprised of 112*a-c*), part of which may be located centrally inside of main body 102. More specifically, vertical channel 112*a* can be centrally positioned within main body 102 such that the channel is equidistant from all side, exterior surfaces of main body 102. Vertical channel 112*a* may proceed through the entirety of the height of main body 102 such that it is a through hole having an opening on a top of main body 102 and an opening on a bottom of main body 102. Alternatively, vertical channel 112*a* may only be open to a top of main body 102, as illustrated in FIGS. 2-5 and 13, and may come to an end within main body 102, such that access to vertical channel 112*a* can only be via its top opening, as illustrated in FIGS. 7, 9, and 15.

In some embodiments, vertical channel 112*a* may include one or more vertical slots 114. More specifically, to prevent pin 104 from rotating when wheel cap 106 is turned and the internal threading of wheel cap engages the exterior threading of pin, pin 104 may include one or more fins or wings 116 that catch on the one or more vertical slots 114 in vertical channel 112*a*. As illustrated in FIG. 2, one embodiment of the adjustable support device may include two vertical slots 114 that are on opposing sides of vertical channel 112*a* such that the two vertical slots 114 are directly across from one another. However, this arrangement should not be limiting and embodiments of the vertical channel having two vertical slots may have those vertical slots positioned closer to one another. Further, some embodiments of the vertical channel may only have one vertical slot or may have three or more vertical slots that are placed equidistant or at non-equal distances from each other. As with the length of vertical channel 112*a*, the length of vertical slots 114 may be the same height as main body 102 such that they have an opening on a top of main body 102 and an opening on a bottom of main body 102. Alternatively, vertical slots 114 may be shorter such that vertical slots 114 are only open to a top of main body 102, as illustrated in FIG. 2, and may come to an end within main body 102, such that access to vertical slots 114 can only be via their top openings, as illustrated in FIGS. 7, 9, and 15. Vertical slots 114 can have widths that are larger than the widths of wings 116 such that wings 116 can easily fit within and slide up and down vertical slots 114.

Main body 102 may be smooth on its outer circumference. Alternatively, main body 102 may have a circumferential channel 136 such that portions of main body 102 above and below the channel may have a wider circumference than the channel. As illustrated in FIGS. 1-2 and 13-15, the remaining entire portion of main body 102 below the channel 136 may have a wider circumference while only a portion of main body 102 above the channel may have a wider circumference (described in more detail below). However, the inverse may be true wherein the entire portion of main body 102 above the channel 136 may have a wider circumference while only a portion of main body 102 below the channel may have a wider circumference. One benefit of having this channel 136 is that band 118 can more securely fasten around main body 102. Band 118 can be a circumferential ring that is relatively uniform along its surface and can fit around main body 102 and within the channel 136. Band 118 may be comprised of rubber or elastic materials and may have a higher friction coefficient so as to offer a gripping surface for a user. For example, band 118 may be made of a non-slip material. The material of band 108 may be soft so that if an object is held, clamped, or supported between two devices, there is a reduced potential for damage to the object.

Main body 102 may also have means of securely connecting to wheel cap 106. More specifically, spring clip 120 may be located within spring clip slot 122 on main body 102 and used to connect a top portion of main body 102 to wheel cap 106, as illustrated in FIGS. 7 and 9. In some embodiments, as illustrated in FIGS. 1-2 and 13-15, spring clip slot 122 can be located on and/or around an external portion or surface of vertical protrusion 124. More specifically, vertical protrusion 124 can be roughly cylindrical and can protrude from a top face/surface of main body 102 and have a smaller circumference than main body 102. As illustrated in FIG. 15, main body 102 can have a bottom face, a side (such as a circumferential side), and a top face, wherein the top face is positioned at a top portion of the side, and vertical protrusion 124 can be positioned above the top face of main body 102 such that it extends further upward past the side(s). More specifically, the side of main body 102 can have a height such that the side includes channel 136 as well as having additional surface area above and below channel 136, and the side can connect a bottom face and a top face of main body 102. As further illustrated in FIG. 15, the circumference of vertical protrusion 124 can be smaller than that of the channel 136 of main body 102, and the channel 136 can be smaller than the circumference of main body 102. In some embodiments, spring clip slot 122 around vertical protrusion 124 may be shallow enough that spring clip 120 can partially extend out from spring clip slot 122 and can engage with wheel cap 106. Further, wheel cap 106 may also have a corresponding internal slot (not illustrated) into which a portion of spring clip 120 can insert. However, spring clip 120 may also be secured to wheel cap 106 using merely tension and friction of the outer circumference of spring clip 120 and interior surface of wheel cap 106.

In an alternative embodiment, main body 202 may have different means of securely connecting to wheel cap 206. More specifically, spring clip 220 may be located within spring clip slot 222 on main body 202. However, instead of spring clip 220 directly connecting a top portion of main body 202 to wheel cap 206, spring clip 220 may be sized and positioned such that it retains retaining plate 238 between the spring clip 220 and the top face of main body 202. In some cases, therefore, retaining plate 238 can be a ring that encircles a bottom portion of vertical protrusion 224. Retaining plate 238 can have a plurality of fastener openings 240 through which mechanical fasteners 242 can be positioned. In some cases, fastener openings 240 can be equidistantly spaced in a circumferential pattern on retaining plate 238 (for example, around center opening 244), as illustrated in FIG. 20. The number of fastener openings 240 can be two or more. While FIG. 20 illustrates the presence of five, equidistantly spaced fastener openings 240, any plurality of openings may be used (for example, as few as two or as many as, for example, 15) and they do not have to be spaced equidistantly; they can be spaced randomly. Mechanical fasteners 242 can be positioned through their corresponding fastener openings 240 and can have a threaded connection with corresponding threaded openings (not illustrated) on a bottom surface of wheel cap 206, thereby securely, and threadedly connecting wheel cap 206 to main body 202.

In some cases, as illustrated in FIG. 20, mechanical fasteners 242 can be positioned upside down, such that the heads of the mechanical fasteners 242 are positioned closer to the bottom of adjustable support device 200 than the threaded portion of the mechanical fasteners 242. As such, the heads of mechanical fasteners 242 may line up with through holes 246 in main body 202. Through holes 246 may, similarly to fastener openings 240 in retaining plate 238, be equidistantly spaced in a circumferential pattern, as illustrated in FIG. 21. Further, they may penetrate completely through main body 202, as illustrated in FIGS. 22-23, allowing for a tool to be inserted through a bottom of main body 202 and through main body until it can make contact with mechanical fasteners 242 above the top surface of main body 102. Therefore, fastener openings 240, mechanical fasteners 242, and through holes 246 can all be aligned along the same axes allowing for wheel cap 206, spring clip 220, and retaining plate 238 to be rotatable around vertical protrusion 224.

As mentioned above, main body 102 may pair with plug 108 to be held in place on a work bench having holes, as illustrated in FIGS. 17 and 19. However, if plug 108 is removed, the adjustable support device may be held in place using lower grip ring 110. Lower grip ring 110 can be a ring, as illustrated in FIGS. 2 and 12, that is permanently or removably affixed to a bottom surface of main body 102. In some embodiments, lower grip ring 110 may be placed on a smooth lower surface of main body 102 such that the entire height of lower grip ring 110 protrudes down past main body 102. However, in other embodiments, as illustrated in FIGS. 7 and 9, lower grip ring 110 may sit in a channel in main body 102. More specifically, as illustrated in FIG. 15, similar to the channel 136 in main body for band 118, main body 102 may have a channel in its bottom face into which lower grip ring 110 may fit. Therefore, a portion of lower grip ring 110 may sit in this bottom face channel of main body 102, while the remainder of lower grip ring 110 may protrude past the plane of the bottom face of main body 102 such that it can make contact with a surface onto which the adjustable support device is placed. Lower grip ring 110 may be either rigid or flexible, but in either form can be made from or covered in a non-slip material having a high friction coefficient to prevent the remainder of the adjustable support device from moving in a medial, distal, proximal, or lateral direction when force is applied by a user to the device or the object being worked on that is being held by the device. Lower grip ring 110 can be relatively flat on its top and bottom surfaces and can be smooth or can have a texture to assist with the non-slip nature of the device. The interior diameter of lower grip ring 110 can be large enough that a top surface of plug 108 can make direct contact with a lower surface of main body 102, as illustrated in FIG. 12. Alternatively, the interior diameter of lower grip ring 110 may simply be large enough for a portion of plug 108 (for example, shoulder screw 130) to fit through and make contact with main body 102. The exterior diameter of lower grip ring 110 can be the same as, or slightly smaller than, the diameter of the bottom surface of main body 102, as illustrated in FIGS. 6-9 and 11-12.

As mentioned above, in addition to main body 102, the adjustable support device can include wheel cap 106. As described above, wheel cap 106 can be relatively disc-shaped and can have gaps or voids around its outer circumference, as illustrated in FIG. 1. Further, as illustrated in FIG. 2, wheel cap 106 can have additional gaps or voids across a portion, or an entirety, of its top surface. For example, as shown in FIGS. 1 and 2, wheel cap 106 can have five, equilaterally spaced voids along its circumference that are each approximately rectangular and those five, circumferential voids can merge into a top void that covers a majority of the top of wheel cap 106. In some embodiments, as illustrated in FIGS. 24-25, in addition to gaps or voids around its outer circumference, wheel cap 206 can have channels 248 within the gaps or voids. The channels 248 can be centrally positioned on each gap/void, can be open on an exterior side such that they are structured and configured to be receptive to other parts along their lengths, and can be the same or a similar height (for example, slightly shorter) compared to the gaps/voids.

As illustrated in FIG. 2, vertical channel 112 can extend through a center of wheel cap 106, such that wheel cap 106 includes vertical channel 112*b*, which can be an extension of vertical channel 112*a*. In this manner, pin point 126 of pin 104 can extend through wheel cap 106 and be available for a user to rest a working object on. As mentioned above, an interior of wheel cap 106, and more specifically the surface of vertical channel 112*b*, can be threaded, as illustrated in FIGS. 7 and 9, so as to make a threaded connection with the external threading on pin 104. Pin 104 may be threaded along a portion or an entirety of its outer surface. For example, as illustrated in FIGS. 13-14, pin may be threaded along an upper portion of pin 104 and beneath pin point 126. Therefore, when wheel cap 106 is turned in a clockwise or counterclockwise direction, the threaded connection between vertical channel 112*b* and pin 104 can cause corresponding movement in pin 104. However, because vertical channel 112*a* has vertical slots 114 that capture wings 116 of pin 104, pin 104 may be prevented from rotational movement in the clockwise or counterclockwise direction and, instead, the threaded connection between vertical channel 112*b* and pin 104 can cause pin 104 to move up and down along vertical channel 112. Wings 116 may be located towards a bottom end of pin 104 and below the threading of pin 104, as illustrated in FIGS. 1-2, 7-9, and 13-15. However, pin 104 may have more threading or, alternatively, be entirely threaded in which case wings 116 may be located over the top of at least a portion of this threading.

In use, when wheel cap 106 is turned a predetermined amount in a first direction, pin 104 can move in an upward direction until pin point 126 breaks the plane of the top surface of wheel cap 106, as illustrated in FIGS. 3-4 and 6-7. Similarly, when wheel cap 106 is turned a predetermined amount in a second, opposite direction, pin 104 can move in a downward direction until pin point 126 falls beneath the plane of the top surface of wheel cap 106, as illustrated in FIGS. 5 and 8-9, and is effectively stored within main body 102 and wheel cap 106. Pin point 126 can be located above the threaded on pin 104 and can be conical in shape. Other shapes may be used instead of a cone, but it is anticipated that any shape would likely have one or more points so as to provide minimal surface area with which to contact the object being worked on by the user. However, points on top of pin point 126 are not necessary, and the top surface of pin point 126 may be flat or curved.

In order to assist with rotation of wheel cap 106, the adjustable support device may also include cap grip 128. Cap grip 128 may be shaped to fill some or all of the voids in wheel cap 106 and can, therefore, be interconnected with the external surfaces of wheel cap 106, as illustrated in FIGS. 3-12. For example, if wheel cap 106 includes five, equilaterally spaced voids along its circumference that are each approximately rectangular, cap grip 128 may include five, equidistantly spaced fingers that extend out laterally from a central portion (for example, a disc) and then extend downward into corresponding, rectangular overhangs. Since it is envisioned that wheel cap 106 can include any number of voids along its circumference, it is also envisioned that cap grip 128 can include any number of fingers with corresponding overhangs as long as the number of voids is equal to or greater than the number of fingers with overhangs. Therefore, all of the voids of wheel cap 106 could be filled by correspondence portions (such as the fingers and central portion or disc) of cap grip 128 or, alternatively, some may be left open. As mentioned above, some embodiments, such as those illustrated in FIGS. 20 and 24-27, can ensure an even more secure connection of cap grip 228 to wheel cap 206. More specifically, channels 248 within the gaps or voids of wheel cap 206, as described above, can correspond to, and be receptive of, protrusions 250 on interior surfaces of the fingers of cap grip 228. As with channels 248, protrusions 250 can be centrally positioned on each finger of cap grip 228 and can be the same or a similar height (for example, slightly shorter) compared to the fingers.

Additionally, cap grip 128 may extend slightly out past the various surface planes of wheel cap 106. In this embodiment, therefore, cap grip 128 may be the portion of the adjustable support device that would contact the object being worked on or that a user would grip to rotate wheel cap 106 in order to move pin 104 up and down along vertical channel 112. In some embodiments, cap grip 128 may include vertical channel 112*c*, which can be an extension of vertical channels 112*a* and 112*b*. For example, if cap grip 128 is configured to sit over a top, central portion of wheel cap 106, cap grip 128 would block vertical channel 112 if it did not include vertical channel 112*c*, and pin point 126 would not be accessible to the user. Therefore, vertical channels 112*a*, 112*b*, and 112*c* all vertically align along vertical axis Y through a center of the adjustable support device, and pin 104 can move up and down through those channels. In additional to vertical channels 112*a*, 112*b*, and 112*c* all being vertically aligned along vertical axis Y, all other components of the adjustable support device may also be vertically aligned along vertical axis Y, as illustrated in FIGS. 1-2.

As mentioned above, a removable, optional component of the adjustable support device is plug 108. Plug 108 may be approximately cylindrical in shape such that it is longer than it is wide. Additionally, plug 108 may be tapered from its top to its bottom (i.e., it has a slightly wider diameter at its top compared to its bottom) or from its bottom to its top (i.e., a slightly wider diameter at its bottom compared to its top). It may be comprised of a compressible material that allows it to be manually inserted into a hole that has the same circumference or a slightly smaller circumference than the circumference of plug 108. In some embodiments, plug 108 may be comprised of at least two materials, wherein a rigid core is coated with a compressible material. The top of plug 108 may be flat to enable to it to sit flush against the bottom of main body 102 (or, optionally, against the bottom of lower grip ring 110). The bottom of plug 108 may also be flat, and plug 108 may have a central, hollow cavity or column through which shoulder screw 130 can be inserted.

More specifically, to attach or remove plug 108 from main body 102, shoulder screw 130 can be inserted through, or located within, the central column of plug 108 and then threadedly attached to a threaded interior portion of main body 102. More specifically, shoulder screw 130 can have tip 132 at a first (for example, top) end and base 134 at or near a second, opposite (for example, bottom) end. In some embodiments, at least a portion of shoulder screw 130 can be threaded. For example, tip 132 can be externally threaded, as illustrated in FIGS. 1-2. Main body 102 can have a hollow, threaded, interior portion that is centrally positioned and below vertical channel 112, as illustrated in FIGS. 12 and 15. Therefore, when shoulder screw 130 is in the central column of plug 108 and plug 108 is attached to main body 102, tip 132 can be positioned above the top planar surface of plug 108 and can be threadedly attached to main body 102 until a top surface of plug 108 is flush against a bottom surface of main body 102, as illustrated in FIGS. 7 and 9. In some cases, as illustrated in FIG. 20, a washer, such as split washer 252, may be positioned around tip 232 and between plug 208 and main body 202 such that plug 208 does not make direct contact with the main body 202. To prevent shoulder screw 130 from being inaccessible to user (for example, if plug 108 is attached to main body 102 and shoulder screw 130 is continuously screwed further into the threaded interior of main body 102), the circumferences of tip 132 and base 134 may vary from that of the main portion of shoulder screw 130. More specifically, the circumference of tip 132 may be smaller than the circumference of the main body of shoulder screw 130, as illustrated in FIG. 1, so that only tip 132 may be insertable into main body 102. Further, the circumference of base 134 and the circumference of the central column of plug 108 may be larger than the circumference of the main body of shoulder screw 130, as illustrated in FIGS. 7 and 9, so that base 134 is incapable of fitting within the central column of plug 108. This enables a user to have a portion of shoulder screw 130 available to grip when inserting or removing shoulder screw 130 and plug 108 from main body 102.

Persons of ordinary skill in arts relevant to this disclosure and subject matter hereof will recognize that embodiments may comprise fewer features than illustrated in any individual embodiment described by example or otherwise contemplated herein. Embodiments described herein are not meant to be an exhaustive presentation of ways in which various features may be combined and/or arranged. Accordingly, the embodiments are not mutually exclusive combinations of features; rather, embodiments can comprise a combination of different individual features selected from different individual embodiments, as understood by persons of ordinary skill in the relevant arts. Moreover, elements described with respect to one embodiment can be implemented in other embodiments even when not described in such embodiments unless otherwise noted. Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended. Furthermore, it is intended also to include features of a claim in any other independent claim even if this claim is not directly made dependent to the independent claim.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

What is claimed is:

1. An adjustable support device comprising:

a main body having a top face, a side, and a bottom face that is spaced apart from the top face, wherein the side connects the top and bottom faces to each other;

a pin housed within the main body, wherein the pin is vertically adjustable and has external threading;

a vertical protrusion that is an extension of the top face of the main body such that the vertical protrusion extends further upward past the side of the main body; and a wheel cap attached to a top of the main body, the wheel cap having internal threading and being threadedly engaged with the pin, wherein the vertical protrusion and the wheel cap have holes in their centers for the pin to protrude through.

2. The adjustable support device of claim 1, further comprising a band positioned around an external, circumferential channel of the main body, wherein the band is entirely located between the top face and the bottom face.

3. The adjustable support device of claim 1, wherein the main body is a solid, cylindrical housing having an internal, vertical channel that is hollow, the vertical channel is equidistant from each side of the main body, the vertical channel has at least one vertical slot along an exterior edge of the vertical channel, the pin is located within the vertical channel and is comprised of at least one wing positioned along a side of the pin, and the at least one wing is within the at least one vertical slot and is configured to slide up and down the at least one vertical slot.

4. The adjustable support device of claim 1, wherein at least an outer surface of the vertical protrusion is a continuous, rounded surface, and the vertical protrusion is positioned around an outside surface of the pin.

5. The adjustable support device of claim 1, wherein the main body, the pin, and the wheel cap are centered on a vertical axis, and the side is positioned completely between the top and bottom faces.

6. The adjustable support device of claim 1, wherein the threaded engagement between the pin and the wheel cap allows for the wheel cap to spin in a single direction a plurality of times.

7. The adjustable support device of claim 1, further comprising:

a plug positioned below the main body; and a shoulder screw configured to removably connect the plug to the main body, wherein the plug is comprised of a compressible material and is tapered from its top to its bottom, the shoulder screw is insertable through a center of the plug, and the shoulder screw is configured to threadedly connect to an interior of the main body.

8. The adjustable support device of claim 7, wherein the main body is a solid housing having an internal, hollow, vertical channel, and a threaded channel for the shoulder screw positioned directly beneath the internal, hollow, vertical channel, and the vertical channel and the shoulder screw are separated by solid material of the main body.

9. The adjustable support device of claim 1, wherein the pin is comprised of at least one wing positioned along a side of the pin and toward a bottom of the pin, and a pin point on a top end of the pin, wherein the pin point is a tapered cone with its tip at an uppermost point of the pin, the external threading of the pin is located below the pin point, the external threading is limited to an upper portion of the pin, and the wing is located below the external threading of the pin.

10. The adjustable support device of claim 9, wherein the at least one wing is comprised of two wings located on opposing sides of the pin, and the external threading is located above the two wings.

11. The adjustable support device of claim 1, wherein the vertical protrusion includes a spring clip slot positioned around a circumferential surface of the vertical protrusion, and a spring clip is located in the spring clip slot.

12. The adjustable support device of claim 11, further comprising a retaining plate having a plurality of fastener openings; and a plurality of mechanical fasteners that are each positioned within a corresponding fastener opening, wherein the retaining plate is positioned between the top face of the main body and the spring clip, and the mechanical fasteners attach the retaining plate to the wheel cap.

13. The adjustable support device of claim 12, wherein the plurality of fastener openings are positioned circumferentially around a center hole of the retaining plate, and the main body has a plurality of through holes that align with the plurality of fastener openings in the retaining plate.

14. The adjustable support device of claim 1, further comprising a cap grip interconnected with external surfaces of the wheel cap, wherein the cap grip has equilaterally spaced fingers that extend out laterally from a central portion and extend downward into corresponding overhangs that are external to the cap grip, and the wheel cap and the cap grip each have a hole in their respective centers for the pin to protrude through.

15. The adjustable support device of claim 14, further comprising a lower grip connected to a bottom of the main body, wherein the cap grip and the lower grip are comprised of non-slip materials.

16. The adjustable support device of claim 14, wherein the wheel cap has equilaterally spaced voids along its circumference that are filled by the corresponding fingers.

17. The adjustable support device of claim 16, wherein the wheel cap has a channel within each of the equilaterally spaced voids, the fingers of the cap grip each have a protrusion on an interior surface, and the protrusions of the fingers correspond to, and align with, the channels of the voids.

18. A method of adjusting an adjustable support device, the method comprising:

gripping a wheel cap that is attached to a main body having a vertical protrusion, wherein the vertical protrusion extends further upward than a top portion of a side of the main body; and spinning the wheel cap in a first direction until a pin point of a pin protrudes a predetermined amount through a top surface of the vertical protrusion and a top surface of the wheel cap, wherein the pin is threadedly engaged with the wheel cap, the pin point is tapered with its tip at an uppermost point of the pin, the pin is further comprised of at least one wing along a side surface, the main body is comprised of an internal, vertical channel that is hollow, the vertical channel has at least one vertical slot along an exterior edge of the vertical channel, and the at least one wing is within the at least one vertical slot and is configured to slide up the at least one vertical slot as the wheel cap is spun in the first direction.

19. The method of claim 18, further comprising attaching a plug to a bottom of the main body by threadedly connecting a shoulder screw to an interior of the main body, wherein the shoulder screw is in a center of the plug, and a bottom of the main body includes an opening to a threaded channel in an interior of the main body.

* * * * *